United States Patent

[11] 3,628,399

[72] Inventors William R. Seitz
 Rochester;
 Donald R. Whitney, Birmingham, both of Mich.
[21] Appl. No. 57,221
[22] Filed July 22, 1970
[45] Patented Dec. 21, 1971
[73] Assignee General Motors Corporation
 Detroit, Mich.

[54] HYDRAULIC LIMITED SLIP DIFFERENTIAL
 4 Claims, 9 Drawing Figs.
[52] U.S. Cl. .................................................. 74/711
[51] Int. Cl. .................................................. F16h 1/44
[50] Field of Search .......................................... 74/711;
 192/35

[56] References Cited
UNITED STATES PATENTS

| | | | |
|---|---|---|---|
| 1,883,725 | 10/1932 | Guilmette .................... | 74/711 |
| 2,949,792 | 8/1960 | Smith .......................... | 74/711 |
| 3,229,550 | 1/1966 | Nickell ........................ | 74/711 |
| 3,365,983 | 1/1968 | Jeakle ......................... | 74/711 |

*Primary Examiner*—Arthur T. McKeon
*Attorneys*—J. L. Carpenter and Robert J. Outland ABSTRACT: Improved limited slip differential arrangements employing hydraulic actuators with hydrodynamic bearing pump pressure developing means wherein the hydraulic clutch-actuating means are disposed between the side gears so as to urge them outwardly to actuate clutches between the side gears and differential case.

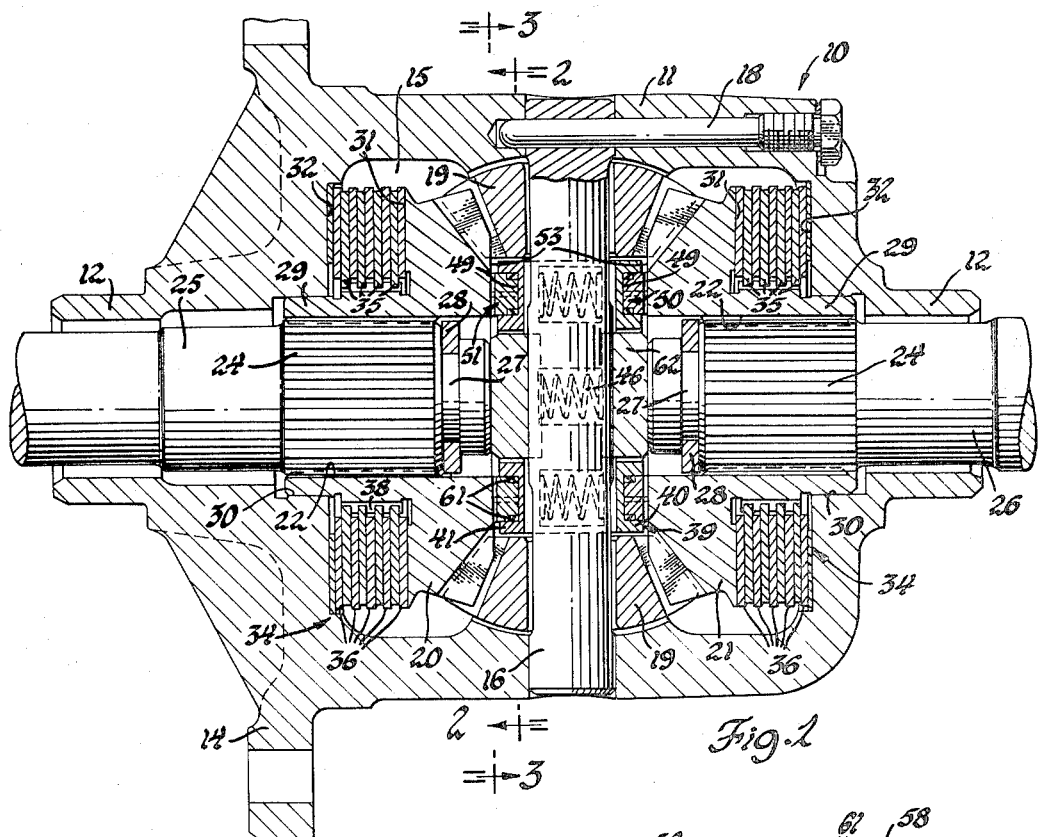
Fig.1
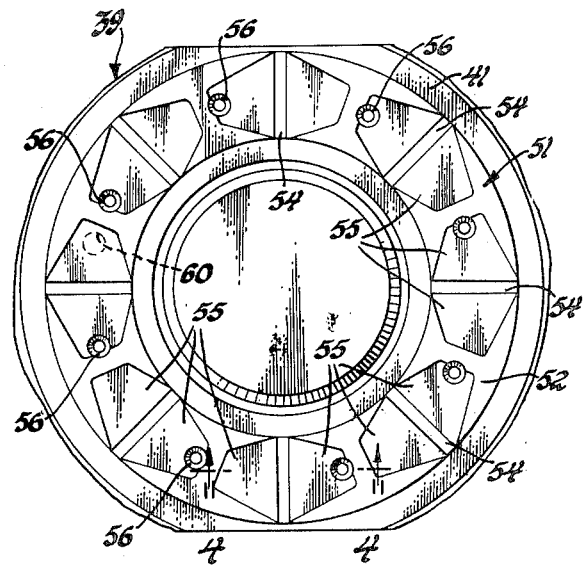
Fig.3
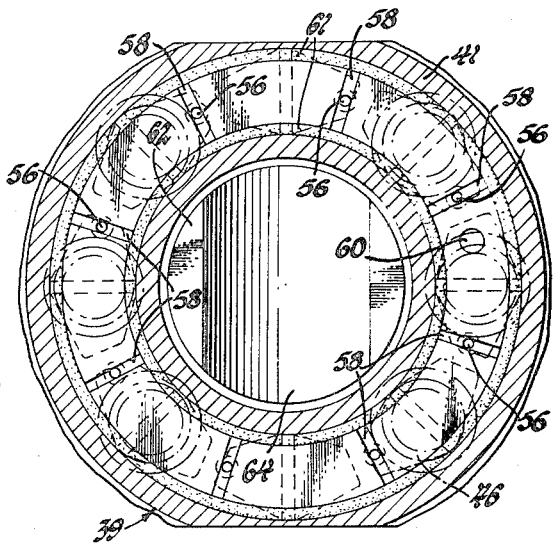
Fig.2
Fig.4
INVENTORS
William R. Seitz &
BY Donald R. Whitney
Robert J. Outland
ATTORNEY INVENTORS
William R. Seitz &
BY Donald R. Whitney
Robert J. Outland
ATTORNEY INVENTORS
William R. Seitz &
BY Donald R. Whitney
Robert J. Outland
ATTORNEY

HYDRAULIC LIMITED SLIP DIFFERENTIAL

FIELD OF THE INVENTION

This invention relates to limited slip differentials and, more particularly, to differentials including hydrodynamically pressurized hydraulic actuators disposed between the side gears and arranged to develop pressure upon relative rotation of the side gears, which is utilized to urge the side gears outwardly to engage friction clutch means and thereby retard free differential action.

DESCRIPTION OF THE PRIOR ART

U.S. Pat. No. 3,490,312 Seitz and DeHart discloses and claims limited slip differential arrangements employing hydraulic actuator means pressurized by hydrodynamic bearing pump devices which develop pressure upon relative rotation of the differential side gears with respect to the case. Since its disclosure of the structure and operation of the hydraulic-actuating means is also applicable to the hydraulic-actuating devices of the present invention, the disclosure of U.S. Pat. No. 3,490,312 is hereby incorporated by reference into this application.

SUMMARY OF THE INVENTION

The present invention involves improved arrangements of hydraulic limited-slip differentials utilizing hydraulic actuators pressurized by hydrodynamic bearing pump means of the general type disclosed and claimed in the aforementioned patent of Seitz and DeHart. The improvement arrangements proposed herein involve the positioning of the actuators between the differential side gears wherein they are preferably integrated with a specially formed spacer member.

The proposed arrangements have the advantage that they can be easily incorporated into conventional mechanically actuated limited-slip differentials with a minimum of modification of the components involved. Also, the arrangements are equally applicable to conventional disk or cone-type clutch units, both of which are presently in commercial use.

These and other advantages of the present invention will be more fully understood from the following description of certain preferred embodiments of the invention, taken together with the accompanying drawings.

BRIEF DESCRIPTION OF THE DRAWINGS

FIG. 1 is a cross-sectional view of a limited-slip differential having hydraulic actuating means disposed intermediate the side gears in accordance with the invention.

FIG. 2 is an enlarged cross-sectional view showing certain details of the hydraulic actuating means and taken generally in the plane indicated by the line 2—2 of FIG. 1.

FIG. 3 is an enlarged cross-sectional view showing additional details of the hydraulic actuating means and taken generally in the plane indicated by the line 3—3 of FIG. 1.

FIG. 4 is an enlarged cross-sectional view through a portion of the hydrodynamic bearing pump means taken generally in the plane indicated by the line 4—4 of FIG. 3.

DESCRIPTION OF THE PREFERRED EMBODIMENTS

Figure 5:
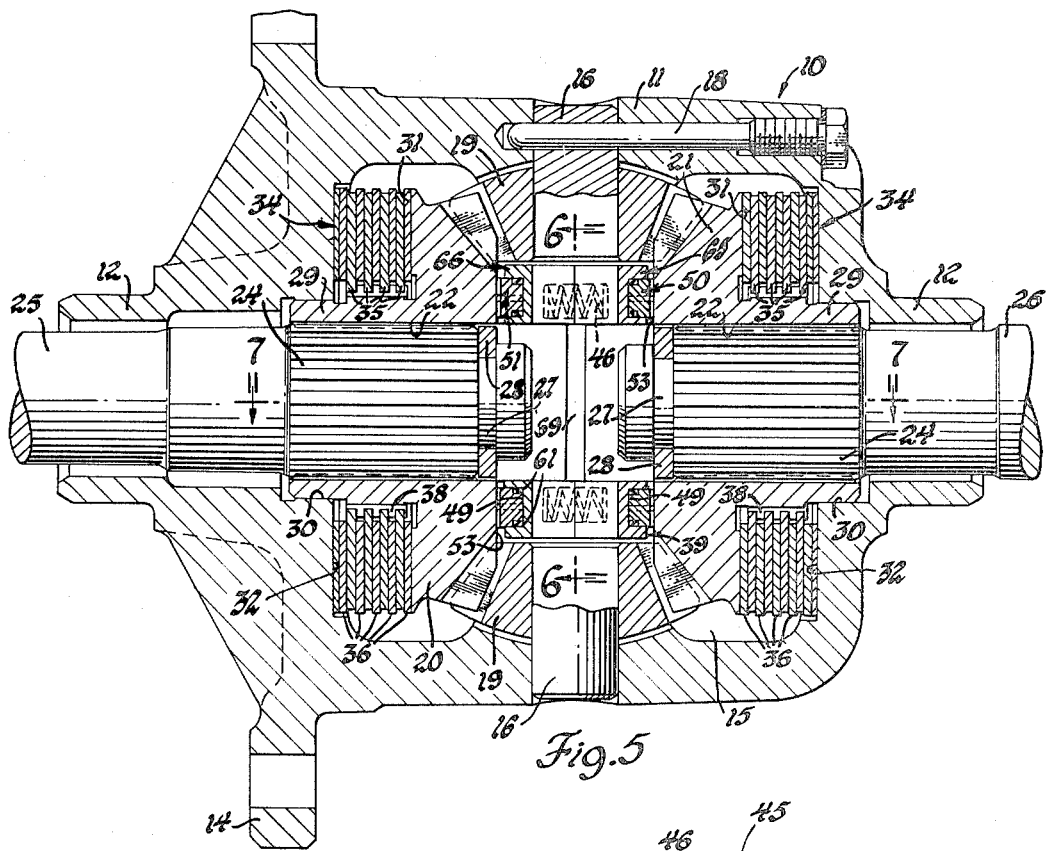
FIG. 5 is a cross-sectional view similar to that of FIG. 1 but showing an alternative arrangement of limited-slip differential formed according to the invention.

Referring first to FIGS. 1 through 4 of the drawings, numeral 10 generally indicates one embodiment of limited slip differential formed according to the invention. Differential 10 includes a case 11 that is rotatably mounted on a pair of hubs 12. The hubs extend from opposite ends of the case and are rotatably supported within a differential carrier or housing, not shown. Case 11 includes a flange 14 to which may be attached a ring gear, not shown, to receive driving torque from the drive line of a vehicle.

The differential case 11 includes an internal cavity 15 into which lubricant carried in the housing of differential 10 enters through openings, not shown, in the wall of the case.

Secured in the walls of case 11 and extending transversely across the cavity 15 is a pinion pin 16. The pin is retained in place by an elongated screw 18 and rotatably supports a pair of pinion gears 19. Pinion gears 19 engage a pair of left and right side gears 20 and 21, respectively, which are rotatably received on opposite sides of the case 11.

Gears 20, 21 have internally splined bores 22 which drivingly engage the mating splines 24 of left and right axle shafts 25, 26, respectively. Inwardly of the splines 24, axle shafts 25, 26 are grooved as at 27 to receive "C" washers 28 which bear against the gear splines 22 to prevent the axle shafts from sliding outwardly.

The gears further include extending hub portions 29 which are rotatably received in counterbores 30 of the case. Radially extending surfaces 31 of the gears are located adjacent the inner ends of the hub 29 and extend in opposed relation to radially extending surfaces 32 of the case formed annularly around the counterbores 30.

Intermediate the opposed surfaces 31, 32 of each side gear and the case is a pack 34 of clutch plates. Each pack 34 is composed of alternately disposed inner and outer annular plates 35 and 36, respectively. Inner plates 35 are internally splined and engage external splines 38 formed on the outer surfaces of hub 29 so as to be rotatably driven with the gears 20, 21. Outer plates 36 have means, not shown, by which they are retained to the case for rotation therewith.

Figure 9:
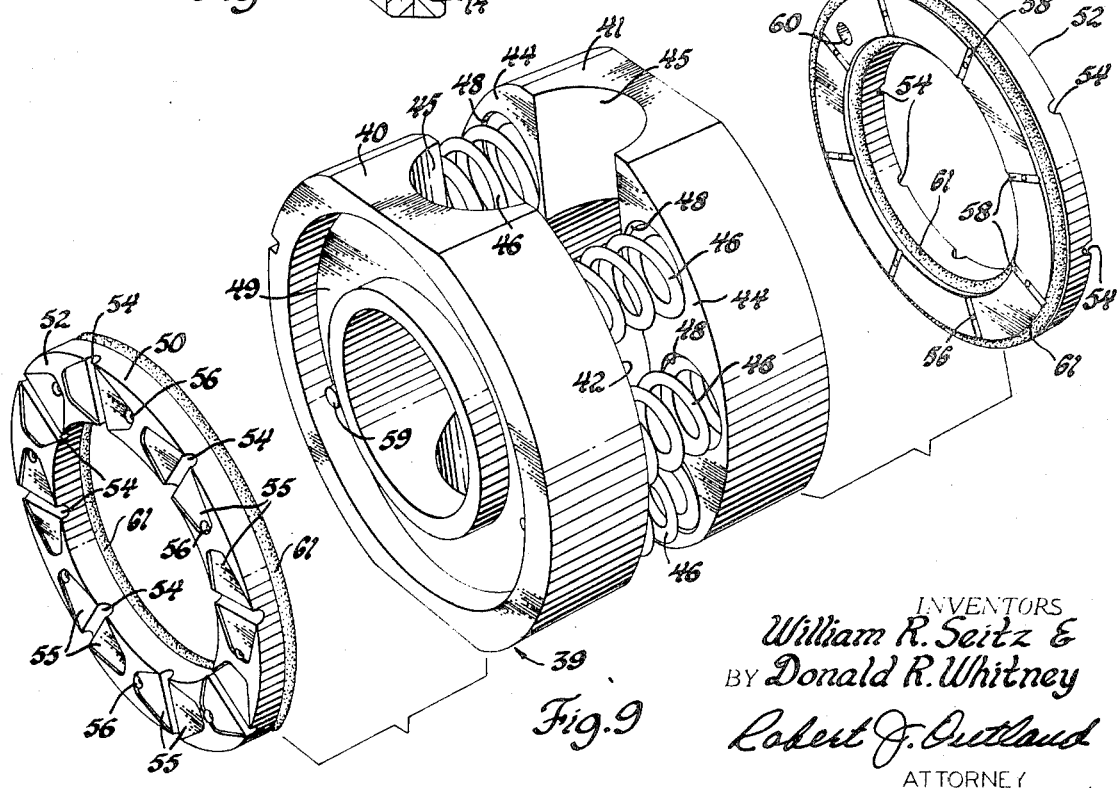
FIG. 9 is an enlarged pictorial view of a spacer block assembly including hydraulic actuating means of the type utilized in the embodiments of FIGS. 1 and 8.

Disposed intermediate the pinion and side gears and surrounding the pinion pin 16 is a spacer or cylinder block assembly generally indicated by numeral 39 and best shown in FIG. 9 of the drawings. Assembly 39 includes a pair of annular block members 40, 41 which include abutting surfaces 42, 44, respectively, by which the blocks engage one another on opposite sides of the pinion pin. Semicylindrical recesses 45 are provided to permit the block members to surround the pinion pin with clearance for limited movement in directions axially of the differential case. A plurality of coil springs 46 are received in opposed aligned holes 48 which open through the abutting surfaces 44, the springs acting to bias the two block members outwardly away from one another and in the directions of their adjacent side gears.

In the outer ends of the block members 40, 41, there are provided hydraulic actuating means generally of the type disclosed in the aforementioned U.S. Pat. No. 3,490,312. These actuating means are preferably formed in part by the outer portions of the block members 40, 41 by the provision of annular recesses 49 which form annular cylinders within the block members. Within these recesses of block members 40, 41 are received annular piston members 50, 51, respectively.

The annular piston members have outer surfaces 52 which are maintained in opposed relation to radially extending inwardly facing surfaces 53 of the side gears 20, 21. Surfaces 52 of the piston members are traversed by a plurality of spaced radially extending oil grooves 54 from which there extend in both directions stepped land thrust bearing recesses 55 of the type discussed in the above-mentioned patent. The counterclockwise extending recesses of piston 52 and the clockwise extending recesses of piston 50 connect through passage openings 56 with the interiors of the cylinders formed by recesses 49. Radial grooves 58 are also provided on the interior surfaces of pistons 50, 51, intersection passage openings 56 to aid in distributing the oil pressure transmitted therethrough.

The pistons 50, 51 are prevented from rotating within cylinders 49 by means of pins 59 which are secured in the bottoms of the annular recesses 49 and extend into blind holes 60 located in the pistons 50, 51. Annular seals 61 are provided at the inner and outer edges of the pistons to seal them in the cylinders.

In order to facilitate installation and removal of the cylinder block assembly and the axle shafts, a cylindrical spacer member 62 is disposed intermediate the axle shafts and within the cylinder block assembly 39. A cylindrical opening 64 extends through member 62 to provide for installation on the pinion pin 16. Spacer member 62 present the axle shafts 25, 26 from moving inwardly while the unit is assembled.

Removal of an axle shaft is accomplished by first removing pinion pin 16 and then pulling out the complete spacer block assembly 39, together with the spacer member 62 through the openings, not shown, provided in the side of the differential case 11. The axle shown can then be moved inwardly so that the "C" lock washers 28 may be removed and the axle shafts pulled out through the outer ends of the differential. Installation is accomplished by reversing the process.

In operation, the differential operates normally during straight ahead motion or slow turns wherein there is little or no relative motion of the side gears. If, however, a condition occurs which causes slippage of one of the vehicle wheels, the increased relative rotational speed of the side gears with respect to the case causes oil pressure to be developed within the stepped land recesses formed in the faces 52 of annular pistons 50 and 51. This occurs because the piston faces 52 are continually urged against the inner surfaces 53 of the side gears by the biasing coil springs 46 and lubricating oil is supplied to the stepped land recesses from the interior of the differential case through the oil grooves 54 which extend radially across the faces 52.

The development of oil pressure in the stepped land recesses occurs in those recesses which extend in the direction of motion of the associated side gear surface over the respective piston surface. Accordingly, depending on the direction of motion, oil pressure will be developed in the stepped lands of one or the other of the two pistons which will be delivered through passages 56 to the interior of the cylinder recess 49 behind the piston 50 or 51. The pressurized oil will then move the piston 50 or 51 outwardly with respect to its block member, taking up any clearance between the two block members and acting through the opposite piston member to urge the side gears outwardly. While a similar piston actuating pressure will not be developed at the same time in the opposite piston member, there will be pressure developed in the stepped lands not connected with passages 56 which will act as thrust bearings and prevent excessive wear of the surface 52 of the nonpressure-developing piston.

Because of the clearance which permits movement of the spacer block members axially in the direction of the axle shafts 25, 26 the development of pressure within either piston cylinder assembly will cause an outwardly directed force to act against both side gears 20, 21, which will, in turn, act upon the clutch pack 34 so as to frictionally retard the relative rotation or differential action of the unit, thereby reducing or stopping the spinning of the slipping wheel and increasing the delivery of torque to the other wheel of the vehicle.

Figure 7:
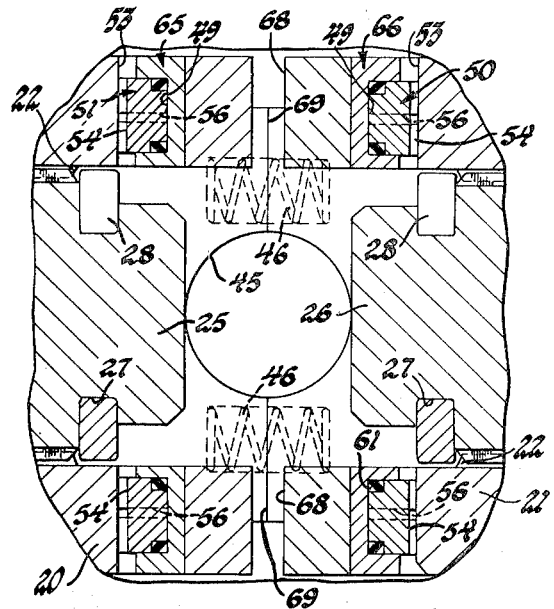
FIG. 7 is an enlarged cross-sectional view showing other details of the interior arrangement taken generally in the plane indicated by the line 7—7 of FIG. 5.
Figure 6:
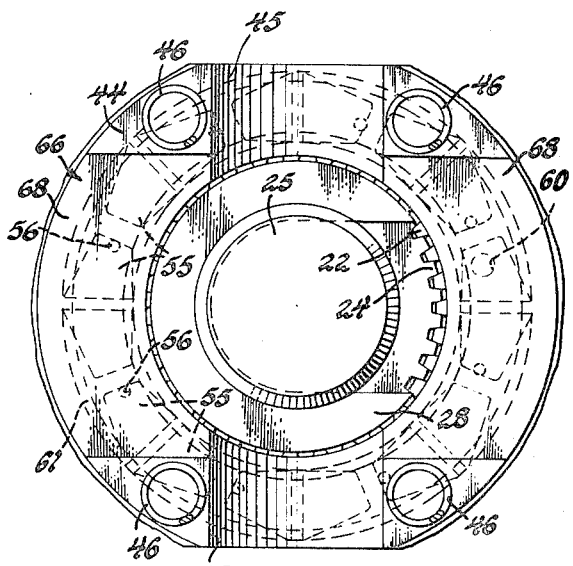
FIG. 6 is an enlarged cross-sectional view showing details of the interior arrangement of the hydraulic actuating and axle retaining means which are taken generally in the plane indicated by the line 6—6 of FIG. 5.

Referring now to FIGS. 5 through 7 of the drawings, there is shown an alternative embodiment of limited slip differential according to the present invention. Since many of the major components of this embodiment are identical to those of embodiment of FIGS. 1 through 4, like reference numerals will be used for like parts and their description will not be repeated.

The differences in the embodiment of FIGS. 5 through 7 lie in construction of the cylinder block members 65, 66 which are provided with transversely extending recesses 68. These coact to form slots 69 extending outwardly from the hollow center of the cylinder block assembly. In this arrangement, no spacer member 62 is utilized as in the first embodiment. Instead, the inner ends of the axle shafts 25, 26 directly engage and are spaced by the pinion pin 16. In view of the provision of slots 69 in the cylinder block members, no biasing springs can be utilized at these locations and, accordingly, the springs must be located at the four spaced locations illustrated in FIG. 6.

When the pinion pin is removed, either axle shaft can be removed from the differential by first moving it inwardly so that its "C" lock washer 28 is aligned with the slots 69 in the cylinder block members. Washer 28 may then be pushed out through one of the slots and the axle shaft may then be pulled out of the differential without removing the cylinder block assembly from the differential. It is, of course, obvious that installation of an axle shaft is merely a reversal of the removal process described.

The remainder of the construction and the operation of the embodiment of FIGS. 5 through 7 is essentially the same as that of the first described embodiment and, accordingly, further description is not believed necessary.

Figure 8:
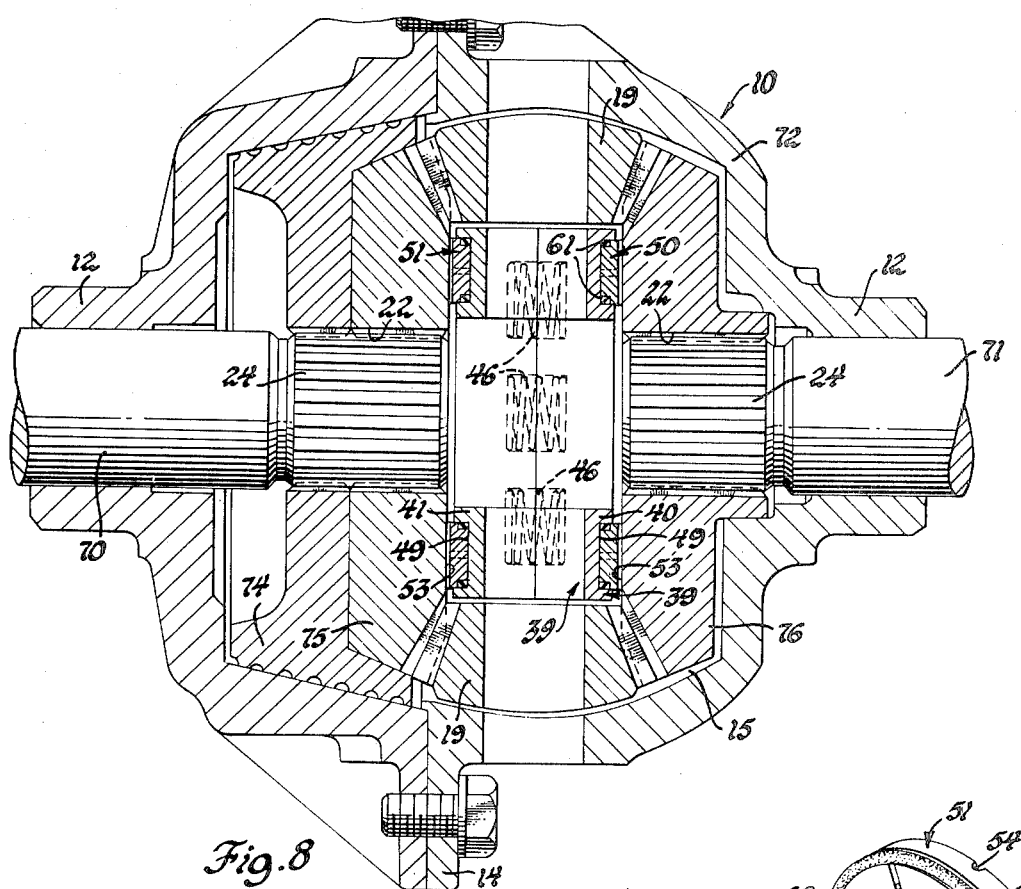
FIG. 8 is a cross-sectional view similar to FIGS. 1 and 5 but disclosing another alternative embodiment of limited-slip differential arrangement according to the invention, utilizing conical clutch means.

Referring now to FIG. 8 of the drawings, there is shown an additional embodiment of limited slip differential formed according to the invention. The construction and operation of this embodiment is basically the same as that of the first described embodiment, differing in only two basic respects. First, the axle shafts 70, 71 are axially located by the outboard wheel bearings (not shown) and, accordingly, do not utilize the "C" lock washers 28 or the spacer block 62 of the first embodiment. Secondly, the differential case 72 is arranged to coact with a conical clutch member 74 and does not include the plate-type clutch packs 34. Conical clutch 74 is splinedly connected to the axle shaft 70 and is engaged by one of the side gears 75, 76.

The operation of the unit is essentially the same as previously described with respect to the first embodiment, except that pressures developed in the hydraulic actuating members, which act outwardly on the side gears, cause the side gear 75 to move the conical clutch member 74 outwardly into engagement with the differential case, thus causing the required frictional resistance to relative rotation.

The action is essentially the same whether only one conical clutch is provided, as shown in the figure, or whether clutches are provided beside both of the side gears as in the first two described embodiments. Since any hydraulic force developed in the cylinder block hydraulic actuating assemblies is equally distributed against both of the two side gears and thus acts to engage any clutch means which are connected with either of them, the number of clutch means provided merely determines the friction resisting and wear capabilities of the unit.

While the invention has been described by reference to certain specific embodiments chosen for purposes of illustration, it should be apparent that numerous modifications of the concepts disclosed herein could be made within the spirit and scope of this invention and, accordingly, the invention is intended to be defined only by the language of the following claims.

We claim:

1. A limited slip differential comprising
    a fluid containing casing adapted to be rotatably drive by input means,
    a pair of side gears rotatably supported in said casing and adapted for connection with a pair of relatively rotatable output members,
    a pinion gear rotatably mounted in said casing and engaging said side gears to rotatably interconnect said side gears and said casing,
    friction clutch means between one of said side gears, and said casing and actuable to frictionally resist relative rotation of said side gears,
    a spacer member disposed intermediate said side gears and rotatable with said casing,
    hydrodynamic bearing pump means connected to one of said spacer and side gear members and having a pressure-developing surface opposing a relatively rotatable surface of the other of said members, said bearing pump means being operable upon relative rotation of said spacer and side gear members to develop a hydraulic pressure between said opposing surfaces, hydraulic motor means responsive to hydraulic pressure therein to act against said spacer and said side gear members to urge said side gears outwardly and actuate said clutch means, and passage means connecting said hydrodynamic bearing pump means with said hydraulic motor means to transmit hydraulic pressure therebetween.

2. The combination of claim 1 wherein said hydraulic motor means comprises an annular cylinder formed within one of said spacer and side gear members and an annular piston received for reciprocating movement within said annular cylinder and defining therewith an enclosed chamber, said cylinder and said piston comprising said hydraulic motor means, and said hydrodynamic bearing pump means and said passage means being formed in said piston.

3. A limited differential comprising a fluid containing casing adapted to be rotatably driven by input means, a pair of side gears rotatably supported in said casing and adapted for connection with a pair of relatively rotatably output members, a pinion gear rotatably mounted in said casing and engaging said side gears to rotatably interconnect said side gears and said casing, friction clutch means between one of said side gears and said casing and actuable to frictionally resist relative rotation of said side gears, a pair of cylinder block members engageably disposed intermediate said side gears and including outwardly opening annular cylinder defining recesses, an annular piston reciprocably disposed within the annular recess of each cylinder, each said piston having a pressure developing surface opposing a relatively rotatable surface of the adjacent side gear, said pistons cooperating with their respective cylinders to comprise hydraulic actuator means having enclosed chambers defined by the respective pistons and cylinders and each side chamber being connected through passage means in its piston with hydrodynamic bearing pump means formed on the pressure developing surface of its said piston, biasing means acting between said cylinder block members and urging them outwardly whereby the pressure developing surfaces of said pistons are biased against the opposing surfaces of said side gears, said hydrodynamic bearing pump means and said passage means being arranged such that upon relative rotation of said side gears in either direction with respect to said casing, hydraulic pressure developed in said hydrodynamic bearing pump means will be transmitted through the passage means of at least one of said pistons to its respective chamber so as to act upon both said piston and said cylinder block members to force both said pistons against their respective side gears, urging them outwardly and actuating said clutch means.

4. The combination of claim 3 wherein said side gears are engaged by axle shafts which are retained by "C" lock washers against outward axial movement, and radially directed slots are provided in the said cylinder members whereby said "C" lock washers may be removed upon sliding said axle shafts inwardly to individually align the lock washers with said slots.

* * * * *

PO-1050
(5/69)

UNITED STATES PATENT OFFICE
CERTIFICATE OF CORRECTION

Patent No. 3,628,399          Dated December 21, 1971

Inventor(s) William R. Seitz and Donald R. Whitney

It is certified that error appears in the above-identified patent and that said Letters Patent are hereby corrected as shown below:

Col. 2, Line 70 - "52" should read --51--; Line 74 - "intersection" should read --intersecting--.

Col. 3, Line 12 - "present" should read --prevents--; Line 18 - "shown" should read --shaft--.

Col. 4, Line 58 - "drive" should read --driven--.

Col. 5, Line 23 - "rotatably" should read --rotatable--.

Signed and sealed this 9th day of January 1973.

(SEAL)
Attest:

EDWARD M. FLETCHER, JR.
Attesting Officer

ROBERT GOTTSCHALK
Commissioner of Patents